United States Patent
Loya Enríquez et al.

(10) Patent No.: US 9,752,019 B2
(45) Date of Patent: Sep. 5, 2017

(54) COMPOSITE MATERIALS BASED ON RUBBERS, ELASTOMERS, AND THEIR RECYCLED

(71) Applicants: KAUTEC TECHNOLOGIES, S.A.P.I. DE C.V., Chihuahua (MX); Centro de Investigación en Materiales Avanzados, S.C., Chihuahua (MX)

(72) Inventors: René Loya Enríquez, Chihuahua (MX); Grecia Andrea Bueno Herrera, Chihuahua (MX); Sergio Gabriel Flores Gallardo, Chihuahua (MX); Erasto Armando Zaragoza Contreras, Chihuahua (MX); Alejandro Vega Ríos, Chihuahua (MX); Mónica Elvira Mendoza Duarte, Chihuahua (MX); Erika Ivonne López Martínez, Chihuahua (MX)

(73) Assignees: Kautec Technologies, S.A.P.I De C.V., Chihuahua (MX); Centro de Investigacion en Materiales Avanzados, S.C, Chihuahua (MX)

( * ) Notice: Subject to any disclaimer, the term of this patent is extended or adjusted under 35 U.S.C. 154(b) by 0 days.

(21) Appl. No.: 14/933,093

(22) Filed: Nov. 5, 2015

(65) Prior Publication Data
US 2016/0222207 A1 Aug. 4, 2016

Related U.S. Application Data

(63) Continuation-in-part of application No. 14/608,327, filed on Jan. 29, 2015, now abandoned.

(51) Int. Cl.
| | | |
|---|---|---|
| C08L 17/00 | (2006.01) |
| C08L 9/00 | (2006.01) |
| C08L 9/02 | (2006.01) |
| C08L 9/06 | (2006.01) |
| C08L 23/22 | (2006.01) |
| C08L 67/00 | (2006.01) |
| C08L 23/16 | (2006.01) |
| C08G 18/76 | (2006.01) |
| C08G 18/42 | (2006.01) |

(52) U.S. Cl.
CPC .......... *C08L 17/00* (2013.01); *C08G 18/4277* (2013.01); *C08G 18/7671* (2013.01); *C08L 9/00* (2013.01); *C08L 9/02* (2013.01); *C08L 9/06* (2013.01); *C08L 23/16* (2013.01); *C08L 23/22* (2013.01); *C08L 67/00* (2013.01); *C08L 2205/02* (2013.01); *C08L 2205/03* (2013.01); *C08L 2205/035* (2013.01); *C08L 2207/20* (2013.01)

(58) Field of Classification Search
CPC ............. C08L 2205/02; C08L 2205/03; C08L 2205/035; C08L 9/06; C08L 9/00; C08L 17/00; C08L 19/003; C08L 75/04; C08L 75/06; C08L 75/08; C08L 75/10; C08L 75/12; C08L 75/14; C08L 75/16; C08L 67/06
USPC .......................................................... 525/123
See application file for complete search history.

(56) References Cited

U.S. PATENT DOCUMENTS

| | | | |
|---|---|---|---|
| 2,879,245 A | | 3/1959 | Green |
| 2,947,736 A | * | 8/1960 | Lundberg ................ C08F 16/24 526/201 |
| 3,383,351 A | * | 5/1968 | Stamberger ............... C08F 8/30 521/137 |
| 3,652,467 A | | 3/1972 | Bunk et al. |
| 3,681,267 A | | 8/1972 | Mayne et al. |
| 3,801,421 A | | 4/1974 | Allen et al. |
| 4,038,341 A | * | 7/1977 | Schwartz, Jr. ........ C08F 299/04 523/527 |
| 4,053,537 A | * | 10/1977 | Ruprecht ........... B29D 99/0057 521/42 |
| 4,244,841 A | | 1/1981 | Frankland |
| 4,327,145 A | * | 4/1982 | Mitani ................... C08G 18/68 264/109 |
| 4,444,921 A | * | 4/1984 | South, Jr. ................. C08K 3/26 523/200 |
| 4,833,205 A | * | 5/1989 | Bauman .................. C08C 19/14 525/123 |
| 5,270,104 A | * | 12/1993 | Mori .................... C08G 63/553 428/220 |
| 5,693,714 A | * | 12/1997 | Bauman .................. C08C 19/12 521/54 |
| 5,851,276 A | * | 12/1998 | Memon ................... C08L 95/00 106/281.1 |
| 5,969,053 A | * | 10/1999 | Bauman .................. C08C 19/12 428/480 |

(Continued)

FOREIGN PATENT DOCUMENTS

WO WO2004013238 2/2004

*Primary Examiner* — Mike M Dollinger
(74) *Attorney, Agent, or Firm* — Defillo & Associates, Inc.; Evelyn A. Defillo

(57) ABSTRACT

The present invention refers to developing and obtaining new composite materials based on rubbers and/or elastomers and/or their recycled can be reused through an in situ polymerization program between the combination of different monomers and/or oligomers type diisocyanate, esters, or organic peroxides cross-linking agent, which in their combination generate a binding agent capable of modifying the intrinsic chemical, thermal, rheological, and mechanical properties in the material and the chains chemical cross-linking originated by the incorporation of organic peroxides which are able to accelerate or decrease the reaction rate.

5 Claims, No Drawings

(56) References Cited

U.S. PATENT DOCUMENTS

| | | | | |
|---|---|---|---|---|
| 6,896,964 B2* | 5/2005 | Kvesic | ............... | C08L 19/003 427/222 |
| 8,283,003 B2* | 10/2012 | Morton-Finger | ....... | E01C 13/08 428/17 |
| 2002/0123564 A1* | 9/2002 | Obrecht | ............... | C08G 18/69 525/30 |
| 2003/0088036 A1* | 5/2003 | Huang | ............... | C08L 61/06 525/523 |
| 2010/0069549 A1* | 3/2010 | Jansen | ............... | C08F 299/04 524/357 |
| 2010/0286297 A1* | 11/2010 | Ortalda | ............... | C08G 18/284 521/130 |
| 2013/0211002 A1* | 8/2013 | Misev et al. | ............. | C08K 5/14 524/605 |

* cited by examiner

COMPOSITE MATERIALS BASED ON RUBBERS, ELASTOMERS, AND THEIR RECYCLED

CROSS REFERENCE TO RELATED U.S. APPLICATION

This application is a continuation-in-part of patent application Ser. No. 14/608,327 filed Jan. 29, 2015, entitled, NEW COMPOSITE MATERIALS BASED ON RUBBERS, ELASTOMERS, AND THEIR RECYCLED, pending, the disclosure of which is incorporated herein by reference.

OBJECT OF THE INVENTION

The present invention refers to developing and obtaining new composite materials based on rubbers, and/or elastomers and/or their recycled can be reused through an in situ polymerization system between the combination of different monomers and/or diisocyanate oligomers, esters, and/or organic peroxides cross-linking agents, which in their combination generate a binding agent capable of modifying the intrinsic chemical, thermal, rheological, and mechanical properties of each base material, due to the chemical curing of the monomers present in the material and the chemical chain cross-linking originated by the interaction of reactive agents between chain and/or the incorporation of organic peroxides which are able to accelerate or decrease the reaction rate.

All of the materials were prepared based on a rubber, and/or elastomers, and/or its recycled from waste materials, which are grinded and sifted on different types of mesh numbers, classified by the American Society for Testing Materials (ASTM) by sieves from 3/8" to 200, in order to obtain a homogeneous particle size, whose particle size may be between 9.51 mm and 0.075 mm. For the production of each one of the binders, the stoichiometric calculations corresponding were performed in equivalent, for example in the case of diisocyanate and/or esters, started from a known value in diol grams (corresponding between 5-90% of the recycled elastomer) and determining the amount of isocyanate and/or diacids (Dimethyl terephthalate and Terephthalic acid) necessary for obtaining the desired ratio of NCO/OH and/or COOH/OH. Subsequently, considering the free NCO equivalents in the prepolymer, was added the required amount of the chain extender (glycerol, ethylene glycol, hexamethylenediamine) required so that in the final material did not contain free NCO. In addition, different materials were generated replacing the chain extenders with organic peroxides and combining the chain extenders in equivalent amounts in % by weight with organic peroxides. The organic peroxides considered by the present invention are dicumyl peroxide, Lauryl peroxide, and benzoyl peroxide.

This invention is related with substantial improvement of product derived from rubber and/or elastomers and/or their recycling the use of chain extenders and/or organic peroxides, and/or and their equivalent combinations to generate new chemical structures through an in situ polymerization system between the combination of different monomers and/or diisocyanate type oligomers, and/or esters, which in their combination generate new binding agents capable of modifying the intrinsic chemical, thermal, rheological, and mechanic properties of each composite material based on rubbers, elastomers, and/or its recycled. Which allows the composition to be transformed through a molding process by compression, rotational molding, extrusion, and injection, transforming it into various products of industrial utility.

BACKGROUND OF THE INVENTION

As of today, there are several patents related to obtaining composited material based on rubber and elastomers. However, the vast majority based its development on the use of various chemical agents with groups including acids and esters of carboxylic acids but do not employ organic peroxides, polyurethanes, and polyesters as in the present invention.

Within the patents of composite material compositions based on rubbers and elastomers related to the present invention are described as follows:

WO/2004/013238, refers to a rubber compound obtained from scrap tires, and its production method. The reference differs from the present invention in the ingredients added to the compound, it is not added to the formulation organic peroxides, and that materials obtained are only based on a rubber liquid styrene butadiene virgin.

U.S. Pat. No. 2,879,245 provides a method of the treatment of recycling tires which includes the reaction of a rubber polymer with material selected from a group that includes acids and esters of carboxylic acids. This invention differs from the present invention in that in the added components do not use polyurethane and organic peroxides to the tire recycling material.

U.S. Pat. Nos. 3,652,467 and 3,681,267 protect an adhesive composition that includes recovering rubber and a residue of the resin recipient that includes dimers monobasic acids and rosin. Differs from the present invention in that the ingredients added to the adhesive final composite and in that the materials obtained only present improvements in adhesive properties and structural properties to generate a composite material.

U.S. Pat. No. 3,801,421 describes an athletic coating laminate that includes a layer comprising vulcanized rubber particles unite to a resin. Differs from the present invention in the components of the formulation for the development of composite material compositions.

U.S. Pat. No. 4,244,841 describes a method for rubber recycling which includes mixing the rubber with a curing mixture containing zinc stearate. This invention differs from the present invention in that the added components do not include polyurethane and organic peroxides to the tire recycling material.

DETAILED DESCRIPTION OF THE INVENTION

The present invention includes the details of the types of materials used and the procedure to develop and obtain new compounds based on rubber, elastomers, and/or it's recycled.

The type of materials that are used in the present invention:

Rubbers

The rubbers and/or elastomers and/or their recycled used in the present invention are:

1—Rubbers based on the butylenes, for example, polybutadiene (BR), poly-acrylonitrile butadiene (NBR), poly-isobutilene (IR), poly-isobutilene isoprene (IIR), and chloroprene (CR), with their corresponding typical compositions show in Table 1.

TABLE 1

Typical compositions of rubber that use as base polibuylenes

| Name | Monomers | Typical Composition |
|---|---|---|
| Polybutadiene BR | Butadiene | 75% Butadiene + 25% styrene |
| GRS, Buna S, SBR | Butadiene + Styrene | 15% Butadiene + 85% styrene |
| GRN, Buna N, NBR | Butadiene + acrylonitrile | 60-80% Butadiene + 40-20% acrylonitrile |
| Neoprene CR | Chloroprene + | 97-98% isobutylenes + 3-2% isoprene |
| GRI, Butyl, IIR | Isobutylene + isoprene | |

2—Rubbers based on ethylene-propylene (EPM and EPDM)

The ethylene and the propylene are combined to form a saturated carbon chain polymer, chemically stable generating an excellent resistance to the heat, the oxidation, the ozone, and the elements. A third non-conjugated diene monomer may be terpolymerized in a controlled manner to keep a saturated chain and an unsaturated reactive zone at one side of the main chain susceptible to vulcanization or chemical modification of the polymer. The terpolymers are referred to as EPDM (ethylene-propylene-diene with the M referring to the saturated chain structure). The ethylene-propylene copolymer is called EPM.

Elastomers

The word elastomer refers to a polymer that has the distinction of being very elastic is a chemical compound formed by thousands of molecules called monomers, which are attached forming huge chains. It is thanks to these large chains that these polymers are elastic because they are flexible and interconnected in a very disorderly way.

The different elastomers referenced in the present invention are derivatives of the previously classified rubbers with the peculiarity that these rubbers are partially or fully cross-linked by different chemical reactions generating a vulcanization state.

Rubber and Elastomers Recycling

The term rubber and elastomer recycling is used for the above-mentioned different polymers which have undergone one or various transformation processes, generating utility materials employees, in various productive sectors and once ending their useful life, they become waste materials that cause environmental pollution.

Binder Form of Composite Materials

The term binder refers to a substance, formed by an in-situ polymerization system between the combination of different monomers and/or diisocyanate oligomers, esters, or cross-linking organic peroxides agents, which are used to give general support to a specific mixture based on rubbers and/or elastomers, and/or it's recycled.

This invention uses different monomers, and/or oligomers of the type diisocyanate, and/or esters to form various functional binders for rubbers and/or elastomers, and/or it's recycled via the in situ polymerization between their combinations. The obtained binders are polyurethane, polyester, and polyurethane-polyester, the object of improving the chemical structure and therefore the intrinsic properties such as thermal, rheological and mechanical, deriving this modification on the employment in the organic peroxides polymerization.

Type Polyurethane Binder

The two main components of the polyurethanes are a hard segment and a soft segment. The "hard segment" is the combination of the diisocyanate components and the chain extender and the "soft segment" is the balance of the polyurethane that is usually the diol component.

Example of a binder used on the present invention base isocianate.

These types of binders are prepared by reacting diisocyanate compounds, polymeric diols, and organic peroxides.

In U.S. Pat. Nos. 6,521,164 and No. 4,371,684 was suggested the preparation of polyurethanes based on these and other diols with combinations of chain extenders to improve processing and injection moldability. Historically, however, little has been explained about how to use these polyurethanes as binders replacing the use of the conventional hydroxyl type chain extenders with organic peroxides in mixtures based on rubbers and/or elastomers, and/or it's recycled. Therefore, it is desired to improve the properties of the polyurethane binder systems with rubber and/or elastomer, and/or its recycled prepared from polyester diols.

The suitable diisocyanates to be used in the preparation of the hard segment of polyurethanes include aromatic, aliphatic, and cycloaliphatic diisocyanates and combinations thereof. A structural unit derived from the diisocyanate is represented by the following formula (—OCN—RNCO—).

wherein R is an alkylene, cycloalkylene, or arylene group. The representative examples of these diisocyanates can be found in U.S. Pat. Nos. 4,385,133; 4,522,975 and 5,167,899. The preferable diisocyanates include 4,4'-diisocyanate diphenylmethane ("MDI"), p-phenylene diisocyanate, 1,3-bis(isocyanatomethyl)-cyclohexane, 1,4-diisocyanate-cyclohexane, hexamethylene diisocyanate, 1,5-naphthalene diisocyanate, 3,3'-dimethyl-4,4'-biphenyl diisocyanate, 4,4'-diisocyanate-dicyclohexylmethane, and 2,4-toluene diisocyanate.

The diols used in the preparation of the polyurethanes and useful in the present invention are compounds containing an average of approximately two reactive groups with isocyanate groups, usually active hydrogen, such as —OH, primary and secondary amines, and/or —SH. Representative examples of the suitable diols include polyester, poly lactone, polyether, polyolefin, diols polycarbonate, and other various diols. They are described in publications such as High Polymers, Vol. XVI; "Polyurethanes, Chemistry and Technology", Saunders and Frisch, Interscience Publishers, New York, Vol. I, p. 32-42, 44-54 (1962), and Vol IL p. 5-6, 198-199 (1964); Organic Polymer Chemistry of K. J. Saunders, Chapman and Hall, London, p. 323-325 (1973); and Developments in Plolyurethanes, Vol. I, J. M. Burst, ed., Applied Science Publishers, p. 1-76 (1978).

The suitable polyester diols include the groups of diols mentioned such as polyester, aliphatic polyester diols, poly caprolactone diols, and aromatic polyester diols. The polyester diols suitable for use in the polyurethane of the present invention are available on the market and may be prepared by specific combinations of properties and costs by known techniques. The present invention may include or not chain extender polyesters made from a glycol, (e.g. ethylene and/or propylene glycol) may or may not be included and a saturated dicarboxylic acid (for example, adipic acid, as well as polycaprolactone diols). By way of a non-limiting example can be mentioned poly(adipate ethylene) glycol, poly(adipato propilene) glycol, poly(adipate butilene) glycol, poly(sebacate neopentyl) glycol.

The suitable polyester diols include those that can be obtained by reacting diols such as 1,4-butanediol, hydroquinone bis(2-hidroxyethyl) ether, ethylene glycol, diethylene glycol, triethylene glycol, propylene glycol, dipropylene glycol, 2-methyl-2-ethyl-1,3-propanodiol, 2-etil-1,3-hexanediol, 1,5-pentanediol, thiodiglycol, 1,3-propanediol, 1,1,3-butanediol, 2,3-Butanediol, 1, neopentylalcohol glycol, 2-dimethyl-1, 2-ciclopentanodiol, 1, 6-hexanediol, 1, 1,2-cyclohexenodiol, 2-dimethyl-1,2-cyclohexanediol, glycerol, trimethylol propane, trimethylol ethane, 1,2,4-butanediol, 1,2,6, pentaerythritol, dipentaerythritol, tripentaeritritol, anhidroanheptitol, mannitol, sorbitol, methyl-glucoside, and similar with dicarboxylic acids such as adipic acid, succinic acid, glutaric acid, azelaic acid, sebacic acid, malonic acid, maleic acid, fumaric acid, phthalic acid, isophthalic acid, terephthalic acid, tretracloroftalico acid, and chlorendic acid; in addition, the acid anhydrides, alkyl esters, and the acid halides of these acids.

The diol or diols used in the polyurethanes, as the component of the soft segment occasionally may contain minority amounts (preferably less than approximately 10 mole %, more preferably less than approximately 5 mole %) of a reactant of superior functionality, such as a triol, as an impurity or for the purposes of modifying the properties, such as a change in the flow or processability. However, for the preferred polyurethanes according to the present invention, there is not added a polyol of superior functionality nor is contained in the soft segment diol.

The hard segment of the polyurethane of the present invention may or may not contain structural units of at least one chain extender. The global amount of the chain extender component is incorporated in the polyurethane in determined quantities by the selection of specific reagents and components, the desired quantities of the hard and soft segments enough to provide good mechanical properties.

Polyester Type Binder

The polymeric chain based on polyester according to the present invention is the fundamental unit of the resin, and depending upon monomers that make up the chain, will be characteristics that the resin may have. This chain is made up of different types of:
- Glycols, molecules which have in its structure two hydroxyl groups (OH), such as ethylene glycol, propylene glycol, and neopentyl glycol.
- Saturated acids, molecules which have carboxyl (COOH) groups in its structure. For example, ortho-phthalic anhydride (in the form of anhydride) and the isophthalic acid.
- Unsaturated acids, molecules that in addition to the carboxyl group have in its structure unsaturated, which are presented as double bonds between carbon and carbon (C=C). These double bonds are the one that are then going to join with the styrene monomer to produce the solidification of the resin. Example, maleic anhydride and its isomer Fumaric acid.

Types of Chain Extenders
  a) 1,4-Butanediol ("Butanediol" or "BDO"). A structural unit of the BDO chain extender is represented by the following formula:

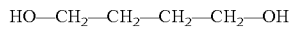

The butanediol may or may not be incorporated in the polyurethane in sufficient quantities to provide good mechanical properties, such as module and tear resistance. This is generally at levels of at least approximately 15-90% of equivalent (% eq.) based on the total equivalent of the NCO/OH ratio.
  b) a linear chain extender different from 1,4-butanediol. The suitable linear chain extenders include ethylene glycol and diethylene glycol; ethylene glycol and 1,3-propane diol; 1 6-hexanediol; 1,5-heptanodiol; or diethylene glycol or triethylene glycol and 1,3-propanediol, or a combination thereof. These chain extenders are usually diol, diamine, or amino alcohol compounds characterized by having a molecular weight of no more than 500 Dalton. In this context, linear refers to a chain extender compound that is not cyclical and does not have an alkyl chain branch from a tertiary carbon. A structural unit of the linear chain extension is represented by the following formula:

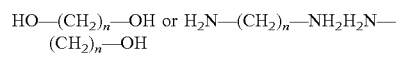

c) the cyclic chain extenders include cyclohexane dimethanol ("CHDM"), and hydroquinone bis-2-hydroxyethyl ether (HQEE).

Organic Peroxides

In the present invention, in order to obtain better properties in different materials, three organic peroxides are used, dicumyl peroxide (DCP), lauryl peroxide (PL), and benzoyl peroxide (PBO) replacing the described chain extenders and in combination with them.

Manufactured of the New Composite Materials Based on Rubber, Elastomers, and their Recycled The new composite materials based on rubber, elastomers, and its recycled together with the different binders according to the present invention may be manufactured by using the processes commonly used to prepare these types of polymer such as reactive mixing, reactive injection molding and molding by compression, pressing, injection molding by reactive extrusion and injection.

The following examples are for illustrative purposes only and are not intended to limit the scope of this invention. In this and the following tables and experiments, the amounts of the reagents components displayed are shown in weight or percentage of equivalent of the reactants used to prepare the material and that as a result the same amount of the reactant or structural unit in the polymer.

EXAMPLES

The indicated levels of raw materials were provided from tanks using tubes, pumps, and flow meters for control flow and provide the appropriate proportions to the feeding tube of an intensive mixer.

The components used for formulation of the materials were the following:
  Diisocyanate MDI,
  4,4'-diisocyanate diphenylmethane,
  diol polycaprolactone diol.
  BDO is 1,4-butanediol.
  catalyst methyl-ethyl ketone (K2000).
  Catalyst propane diol with diazabicyclo [2.2.2] octane (AM33)
  Organic peroxides of the type are dicumyl, Lauryl, and benzoyl.

Procedure
1. All materials were prepared on the basis of a 2000 grs of a recycled elastomer like 100% of the mixture, which was shredded and sifted through different homogeneous particle sizes sieves classified by the American Society for Testing Materials (ASTM) by sieves of ⅜" to 200 mesh corresponding to a particle size between 9.51 mm a 0.75 mm.
2. For the incorporation of each one of the binders (polyurethane type and/or polyester), the stoichiometric calculation was made for the corresponding quantities in equivalent, starting with 200 grams of the diol (corresponding to 10% of recycled elastomer) and determining the amount of diisocianate and/or esters necessary for achieving the desired NCO/OH and/or COOH/OH ratio=2.
3. Subsequently, considering the free NCO equivalents in the prepolymer, the amount required of the chain extender (1,4-butanediol) between 0.1-5% of the recycled elastomer, was added so that in the final polyurethane does not include free NCO.
4. With the objective to obtain better properties in the different materials, was added between 0.1-5% of the recycled elastomer, different types of organic peroxides, dicumyl peroxide (DCP) or Lauryl peroxide (PL) or benzoyl peroxide (PBO) replacing the chain extenders previously described and combination of them.
5. The formulation obtained from recycled elastomer, binders, chain extenders, and peroxides are added to a mixer for a time and temperature that can vary between 10 minutes -1 hour and 25° C. to 200° C.
6. The mixed material is placed in a hydraulic press with a pressure of 1-20 kg/cm$^2$ and temperatures ranging from room temperature to 300° C. for a period of time from a range of 2-30 minutes depending on the product and of the same size. The composite materials from the previous step may be used to manufacture various products such as sport hurts?, waterproofing and coating materials through processes such as reactive mixing, molding by reactive injection, molding by compression, calendering, molding by injection and reactive extrusion.
7. The product is left cooling and subsequently passed to the cutting area.

Table 2 includes amounts in grams of reagents used and the percentage of free NCO free in the prepolymer.

TABLE 2 quantities in grams of reagents used in the formation of the binder

| Sample | Binder | NCO/OH | Diol | Diisocyanate | % NCO free | Chain Extender (1,4 butane diol) | Organic Peroxide |
|---|---|---|---|---|---|---|---|
| 1 | MDI | 2 | 200 | 35.7 | 2.6 | 10.4 | |
| 2 | MDI | 2 | 200 | 35.7 | 2.6 | 6.4 | |
| 3 | MDI | 2 | 200 | 35.7 | 2.6 | 2.4 | |
| 4 | Polyester | 2 | 200 | | | 10.4 | |
| 5 | MDI | 2 | 200 | 35.7 | 2.6 | | 10.4 |
| 6 | MDI | 2 | 200 | 35.7 | 2.6 | | 6.4 |
| 7 | MDI | 2 | 200 | 35.7 | 2.6 | | 2.4 |
| 8 | Polyester | 2 | 200 | | | | 10.4 |
| 9 | MDI | 2 | 200 | 35.7 | 2.6 | 5.2 | 5.2 |
| 10 | MDI | 2 | 200 | 35.7 | 2.6 | 3.2 | 3.2 |
| 11 | MDI | 2 | 200 | 35.7 | 2.6 | 1.2 | 1.2 |
| 12 | Polyester | 2 | 200 | | | 5.2 | 5.2 |

What is claimed is:

1. A material based on rubbers, elastomers, and/or recycling thereof consisting of:
   a) at least one rubber based on polybutadienes, butadiene-styrene, poly-acrylonitrile butadiene, neoprene, butyl rubbers, poly-isobutylenes, poly-isobutylene isoprene, chloroprene; or ethylene- propylene, the at least one rubber having a particle size between 9.51 mm to 0.075 mm;
   b) at least one elastomer derivative of the rubbers of a), wherein the at least one rubber derivate is partially or totally cross-linked and having a particle size between 9.51 mm to 0.075 mm; and
   c) at least one recycled rubber, the recycled rubber is partially or totally cross-linked by different chemical reactions generating a vulcanization state; having homogeneous sizes with a particle size between 9.51 to 0.075 mm;
   d) a polyurethane binder including a soft segment and a hard segment, the soft segment is in the amount of 10 to 90% by weight, based on a total weight of the polyurethane;
   the hard segment includes diisocyanates selected from the group consisting of 4,4'-diisocyanate diphenylmethane ("MDI"), p-phenylene diisocyanate, 1,3-bis(isocyanatomethyl)- cyclohexane, 1,4-diisocyanate-cyclohexane, hexamethylene diisocyanate, 1,5-naphthalene diisocyanate, 3,3'-dimethyl-4,4'-biphenyl diisocyanate, 4,4'-diisocyanate-dicyclohexylmethane, and 2, 4-toluene diisocyanate;
   the soft segment polyester diols obtained by the reaction of:
   diols selected from the group consisting of 1,4-butanediol, hydroquinone bis(2-hidroxyethyl) ether, ethylene glycol, diethylene glycol, triethylene glycol, propylene glycol, dipropylene glycol, 2-methyl-2-ethyl-1,3-propanodiol, 2-etil-1,3-hexanediol, 1,5-pentanediol, thiodiglycol, 1,3-propanediol, 1,1,3-butanediol, 2,3-Butanediol, 1, neopentylalcohol glycol, 2-dimethyl-1, 2-ciclopentanodiol, 1, 6-hexanediol, 1, 1,2-cyclohexenodiol, 2-dimethyl-1,2-cyclohexanediol, glycerol, trimethylol propane, trimethylol ethane, 1,2,4-butanediol, 1,2,6, pentaerythritol, dipentaerythritol, tripentaeritritol, anhidroanheptitol, mannitol, sorbitol, methylglucoside, and
   dicarboxylic acids selected from the group consisting of adipic acid, succinic acid, glutaric acid, azelaic acid, sebacic acid, malonic acid, maleic acid, fumaric acid, phthalic acid, isophthalic acid, terephthalic acid, tretracloroftalico acid, and chlorendic acid;
   e) optionally a chain extender; and
   f) an organic peroxide selected from the group consisting of dicumyl peroxide, lauryl peroxide, and benzoyl peroxide.

2. The material according to claim 1, wherein the at least one rubber and the at least one elastomer derivative of a) are of a pure origin or a recycled origin.

3. The material according to claim 1, wherein the polyurethane binder is in an amount of from 3% to 80% in weight based on a total weight of the polymeric matrix.

4. The material according to claim 1, wherein the soft segment of the polyurethane binder contains a homogeneous mixture of a polymeric central chain based on polyester which is dissolved in a styrene monomer; the chain is formed by:
   glycols including two hydroxyl groups (OH), the glycols are selected from the group consisting of ethylene glycol, propylene glycol, and neophentyl glycol;
   saturated acids including carboxyl groups (COOH) including —orthophthalic anhydride or isophthalic acid; and
   unsaturated acids having molecules including unsaturation with double bonds between carbon and carbon (C=C) including maleic anhydride or fumaric acid;
   where the soft segment of the polyurethane binder is formed by a homogeneous mixture of a polymeric central chain based on a polyester mixed with the organic peroxide in a quantity of 1% to 10% by weight of the total weight of the polyurethane binder.

5. The material according to claim 1, wherein the polyurethane -binder is present in the amount of 5% to 95% in weight based on the total weight of the polymeric matrix.

* * * * *